July 16, 1963 N. R. DE GRAAF 3,098,220

PERSONAL CALL SYSTEM

Filed Jan. 19, 1959 6 Sheets-Sheet 2

July 16, 1963 N. R. DE GRAAF 3,098,220

PERSONAL CALL SYSTEM

Filed Jan. 19, 1959 6 Sheets-Sheet 4

July 16, 1963 N. R. DE GRAAF 3,098,220

PERSONAL CALL SYSTEM

Filed Jan. 19, 1959 6 Sheets-Sheet 6

United States Patent Office 3,098,220
Patented July 16, 1963

3,098,220
PERSONAL CALL SYSTEM

Nicolaas R. de Graaf, Emmen, Netherlands, assignor to N.V. Nederlandsche Industrie Radio Artikelen, Emmen, Netherlands Filed Jan. 19, 1959, Ser. No. 787,485
Claims priority, application Australia Aug. 20, 1958
7 Claims. (Cl. 340—311)

This application is a continuation-in-part of my co-pending application, Serial No. 510,331, filed May 23, 1955, and now Patent 2,870,435, granted January 20, 1959.

The invention relates to a personal call system, and in particular to a system wherein a plurality of individuals in a certain area, such as a building or a plurality of adjacent buildings, may be selectively called by means of modulated carrier signals having certain frequency parameters characteristic for each of the said individuals.

It is an object of the invention to provide simple and reliable selecting means for the said frequency parameters.

Another object of the invention is to provide means whereby a single set of selecting members, such as keys, may be used first to select a carrier frequency characteristic for the individual to be called, and then again to select a modulating frequency characteristic for this individual, without requiring other selecting operations than the successive actuation of two of the said selecting members.

Still another object of the invention is to provide means for resetting the circuit to its zero position if the operator fails to make a second selection after having made the first one.

A further object of the invention is to provide means for notifying the operator if the wanted individual is absent from the area in which the system is operative.

A still further object of the invention is to provide suitable automatic timing means whereby the duration of the transmission of a call signal is restricted to a predetermined time interval.

Further objects and characteristics of the invention will appear from the following description of a preferred embodiment thereof, given with reference to the accompanying drawings, wherein FIG. 1 is a functional block diagram of a personal call system according to the invention;

FIGS. 2–5 are the schematic circuit diagram of the transmitter of a system according to the invention, and FIG. 6 is a schematic circuit diagram of a receiver.

The complete detailed circuit diagram of the transmitter may be obtained by placing FIGS. 2–5 one above the other, with FIG. 2 at the bottom and FIG. 5 at the top. More in particular—

Figure 1:
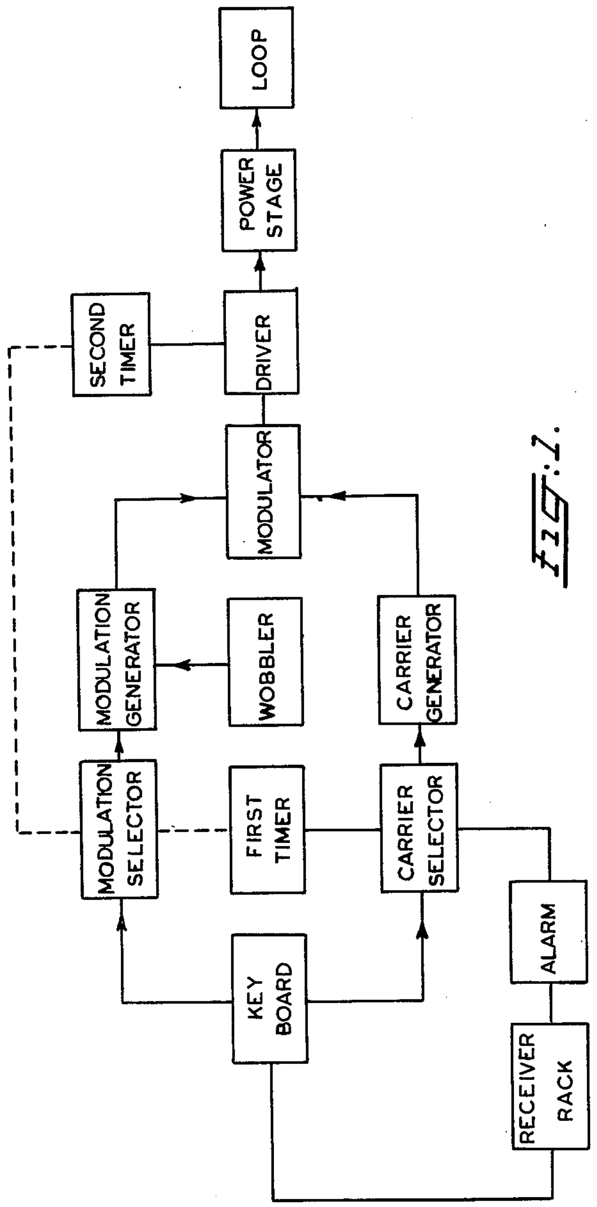

Before proceeding to a detailed description of the circuit diagrams, the general operation of the circuit will be explained.

Each of the persons to be called is provided with a pocket receiver which he carries around on his person. This receiver has a high frequency part tuned to a certain carrier frequency, a detector, and an audio frequency part tuned to a certain modulating frequency and operating a small loud-speaking telephone. Hence, in order to call a certain person, a signal must be transmitted to operate his receiver, and this signal is characterized by a particular carrier frequency and by a particular modulating frequency. This signal is supplied to a loop circuit surrounding the area in which the system is operative. The desired carrier and modulating frequencies are selected by means of a key board, of which two keys must be operated to obtain the desired signal, the first operation serving to select the desired carrier frequency, and the second to select the desired modulating frequency. Means are provided for resetting the system to its zero position if the operator fails to operate a second key. After selection of the required carrier and modulating frequencies, the calling signal individual to the wanted person is transmitted through the loop circuit during a certain time interval; at the end of this interval, the system is reset to its zero position. If the person to be called is absent, i.e. if he has deposited his receiver in the receiver rack provided for this purpose, the operator is informed of his absence by an alarm signal. The audio frequency oscillator by means of which the desired modulating frequency is generated is controlled by a low frequency saw-tooth oscillator in such manner that the modulating frequency varies slowly in the rhythm of the oscillations of said saw-tooth oscillator. As the pocket receivers of the persons to be called are very sharply tuned to a definite audio frequency, the slow variation of the modulating frequency has the effect of interrupting the operation of the telephone of the receiver, so that an intermittent signal is produced in the receiver. By means of special keys, the operator may interrupt the transmission of the calling signal, continue the transmission after expiration of the time interval provided for the transmission, and change the frequency of the saw-tooth oscillator so as to alter the repetition frequency of the intermittent signal produced in the receiver.

The transmitter shown in FIGS. 2–5 of the drawings is intended for a system in which 45 different persons may be called. Accordingly, five different carrier frequencies may be produced, and each of these carrier frequencies may be modulated with nine different modulating frequencies. Each of the individual signals of the said 45 persons is characterized by a number consisting of two digits, of which the first digit indicates the carrier frequency, and the second the modulating frequency. Thus, the numbers of the said persons are 11–19, 21–29, 31–39, 41–49 and 51–59. Of course, the number of carrier frequencies and the number of modulating frequencies may be varied at will to satisfy any prevailing requirements.

Referring to the block diagram shown in FIG. 1 the two digits characterizing the person to be called are successively selected by means of a key board. The first digit serves to set a carrier selector which determines the carrier to be transmitted. The second digit serves to set a modulation selector which determines the modulating frequency. The carrier selector is controlled by a first timer of which the operation is initiated upon selection of the first digit, and which resets the carrier selector to its zero or rest position after a certain time interval if the operator fails to select a second digit. Upon selection of a second digit, the operation of the first timer is interrupted by the modulation selector, as indicated by a dotted line. The carrier is generated by a carrier generator, having the operating frequency controlled by the carrier selector. The modulating frequency is generated by a modulation generator, controlled by the modulation selector. A wobbler coupled with the modulation generator provides for a frequency modulation of the modulating frequency. The carrier and the wobbled modulating frequency are supplied to a modulator which is coupled through a driver and a power stage with a loop surrounding the operating area of the system. The driver is coupled with a second timer, of which the operation is initiated by the modulation selector upon selection of the second digit, as indicated by a dotted line. The second timer serves to interrupt the operation of the system after a suitable time interval. Persons leaving the area in which the system is operative place their receivers in a receiver rack, which is operatively connected with the key board. If the operator selects the number of a person who has placed his receiver in the rack, i.e. who is absent from the area, an alarm is actuated by a circuit connecting the key board with the carrier selector through the receiver rack.

Figure 2:
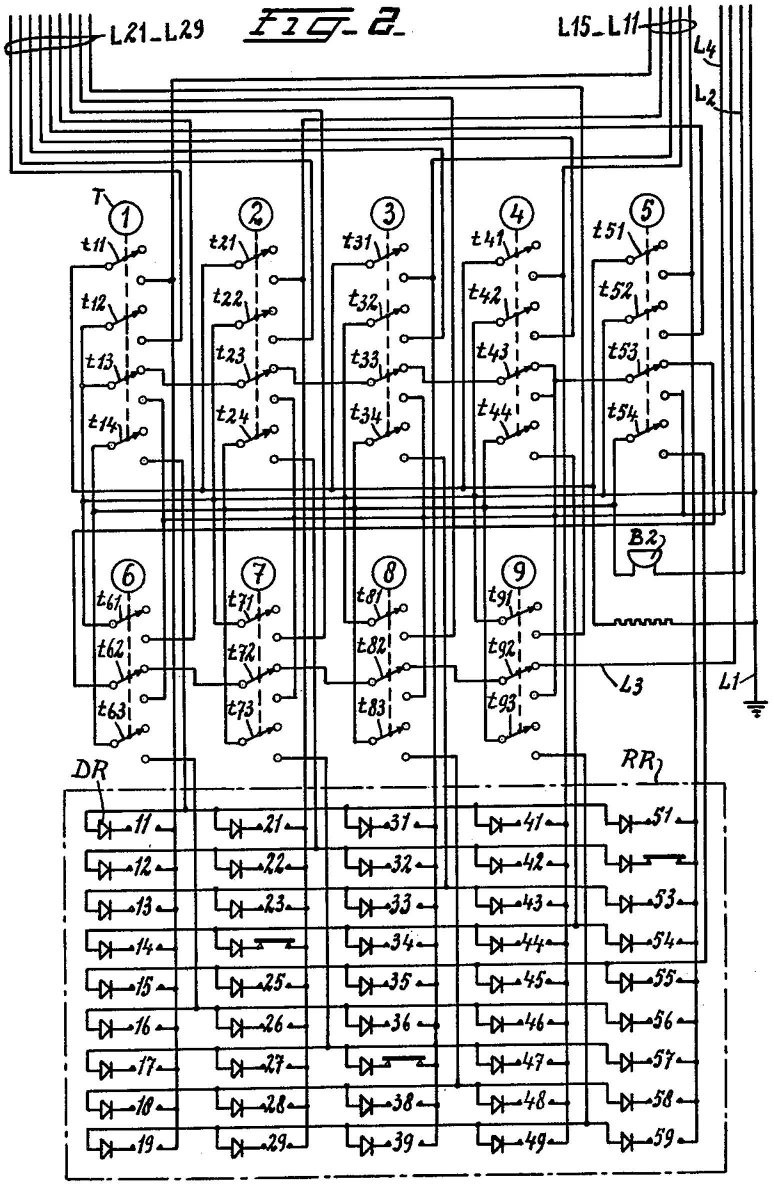
FIG. 2 shows the circuit diagrams of a receiver rack adapted to accommodate the receivers of the persons to be called when they leave the area in which the system is operative, and of a plurality of key operated selector switches serving to select the signal individual to a wanted person.

Referring now in particular to FIG. 2, the receiver rack RR comprises forty-five berths or positions for the receivers, numbered as indicated above. Each berth contains two contacts, of which, the left one is reached through a decoupling rectifier DR. On their arrival, the persons to be called take their receivers from the rack, and attach the same to their clothes by means of a suitable clip; when they leave, they put the receivers again into the rack. Thus, the presence of a certain receiver in the rack indicates that the person in question is absent. When a receiver is in the rack, the two contacts in the berth are interconnected by a conductor provided for this purpose on the receiver. For purposes of illustration, it has been assumed that the users of receivers 24, 37, and 52 are absent, so that the contacts of the associated berths are shown interconnected in FIG. 2.

The carrier and modulating frequencies individual to a wanted person are selected by means of a set of keys T, bearing the digits from 1 to 9. Each of keys 1 to 5 operates a set of four switches, indicated at *t*11–*t*14 for key 1, *t*21–*t*24 for key 2, *t*31–*t*34 for key 3, *t*41–*t*44 for key 4, and *t*51–*t*54 for key 5. Each of keys 6 to 9 operates a set of three switches, indicated at *t*61–*t*63 for key 6, *t*71–*t*73 for key 7, *t*81–*t*83 for key 8, and *t*91–*t*93 for key 9. When none of the said keys is depressed, a circuit runs from ground through switches *t*13, *t*23, *t*33, *t*43, *t*53, *t*62, *t*72, *t*82 and *t*92 to line L3. This circuit is interrupted as soon as any one of the keys is depressed.

Upon depression of any one of keys 1 to 5, the associated line of the group L11–L15 is grounded through resistor R1 by means of the topmost switch *t*11—*t*51; the associated line of group L21–L29 is grounded by means of the second switch *t*12—*t*52; line L4 is grounded by means of the third switch *t*13—*t*53, and the left contacts of the associated horizontal row of berths of receiver rack RR are connected with line L2 through buzzer BZ by means of the lowermost switch *t*14—*t*54.

Upon depression of any one of keys 6 to 9, the associated line of the group L21–L29 is grounded by means of the topmost switch *t*61—*t*91; line L4 is grounded by means of the second switch *t*62—*t*92, and the left contacts of the associated horizontal row of berths of receiver rack RR are connected with line L2 through buzzer BZ by means of the lowermost switch *t*63—*t*93.

The right contacts of each vertical column of berths in the receiver rack RR are connected with the associated line of the group L11–L15.

Figure 3:
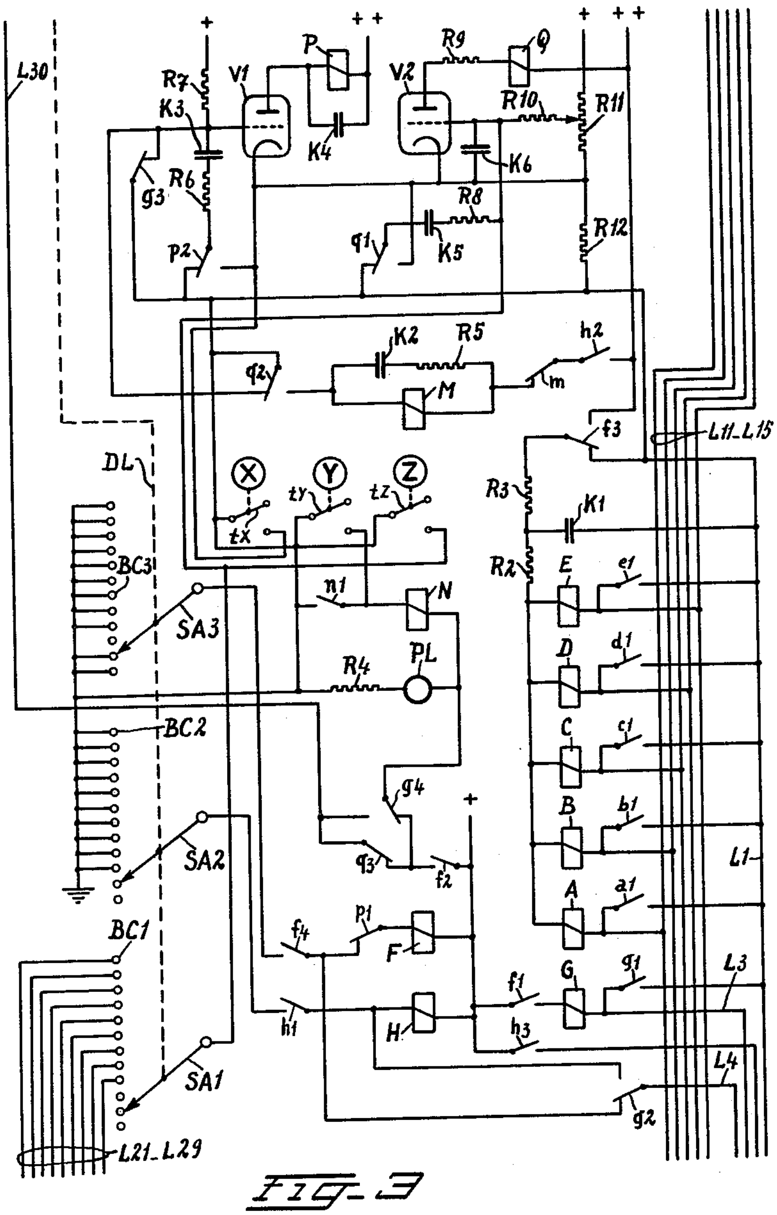
FIG. 3 shows the circuit diagrams of three further key operated switches, a plurality of relays controlling the operation of the transmitter, part of an electromagnetic selector switch, and two electronic timing circuits.

Referring to FIG. 3, five carrier selecting relays A, B, C, D and E are each connected with one of lines L11–L15, and each provided with a holding contact *a*1, *b*1, *c*1, *d*1 or *e*1, respectively, connected with ground line L1. An operating voltage may be supplied from positive terminal ++ to relays A–E through a contact *f*3 and a filter comprising two resistors R2 and R3, and a condenser K1.

A first preparing relay F is connected with line L4 through contacts *p*1 and *g*2 (in its rest position). A second preparing relay H is connected with line L4 through contact *g*2 (in its working position). A relay G, having a holding contact *g*1, is connected wtih line L3, and may be energized through a make contact *f*1 of relay F. Line L2 may be connected to the positive terminal + of a voltage source through a make contact *h*3 of relay H.

A pilot lamp PL, connected in series with a resistor R4, may be connected with the positive terminal of a voltage source either through contacts *f*2 and *g*4 (in its rest position), or through contacts *f*2, *q*3 and *g*4 (in its working position).

A first timing circuit, serving to check whether the operator selects a second digit after having selected the first one, and to reset the system to its zero position if the operator fails to do so, comprises a triode V1 of which the anode circuit comprises a relay P, shunted by a condenser K4. The control grid of triode V1 is connected with the positive terminal of a voltage source through a resistor R7, and with the cathode through a circuit comprising a condenser K3, a resistor R6 and a contact *p*2 (in its rest position); said last-mentioned circuit is shunted by a break contact *g*3 and by a contact *q*2 (in its rest position).

A second timing circuit, serving to determine the duration of the transmission of a call signal, comprises a triode V2, of which the anode circuit comprises a relay Q in series with a resistor R9. The cathodes of valves V1 and V2 are interconnected and grounded through a common resistor R12. The control grid of triode V2 is connected with the tap of a potentiometer R11 inserted between the cathode and the positive terminal of a voltage source through a resistor R10. Furthermore, said control grid is connected with the cathode through a condenser K6, and through a circuit comprising a resistor R8, a condenser K5, and a contact *q*1 (in its rest position).

The selection of the required modulating frequently is performed by means of an electromagnetic selector switch, driven by a magnet M, and having five switch arms. Three of these switch arms are shown in FIG. 3 at SA1, SA2, and SA3. Switch arm SA1 is connected with the control grid of triode V2, and cooperates with a bank of contacts BC1.

The bank BC1 comprises twelve contacts, of which the first nine contacts are each connected with one of lines L21–L29. Switch arm SA2 is connected with relay H through a holding contact *h*1, and cooperates with a bank of contacts BC2, of which the first ten contacts are grounded. Switch arm SA3 is connected with relay F through a holding contact *f*4, and cooperates with a bank of contacts BC3, of which all contacts except the tenth one are grounded. The switch arms are mechanically interconnected as indicated by the dotted line DL.

The driving magnet M of the electromagnetic selector switch is shunted by the series connection of a resistor R5 and a condenser K2, and provided with a break contact *m*. It may be energized through a circuit comprising a make contact *h*2 of relay H, the said contact *m*, and a contact *q*2 (in its working position).

A set of three special keys is provided, bearing the symbols X, Y, and Z, and each operating a switch *tx*, *ty*, or *tz*, respectively. Upon depression of key X, the cathode of triode V2 is grounded whereby the transmission of the calling signal is interrupted, as will be more fully explained hereinafter. Upon depression of key Y, a relay N, having a holding contact *n*1, is energized, whereby the operating frequency of the saw-tooth oscillator used for wobbling the modulating frequencies is changed. Upon depression of key Z, the control grid of triode V2 is grounded, whereby the transmission of the call signal is continued for an indefinite period of time. Key Z is constructed in such manner as to be locked in its depressed position, and may be released by depressing key X, which has been mechanically interconnected with key Z for this purpose.

A line L30 leading to the power stage of the transmitter may be energized through contacts f2 and q3.

Figure 4:
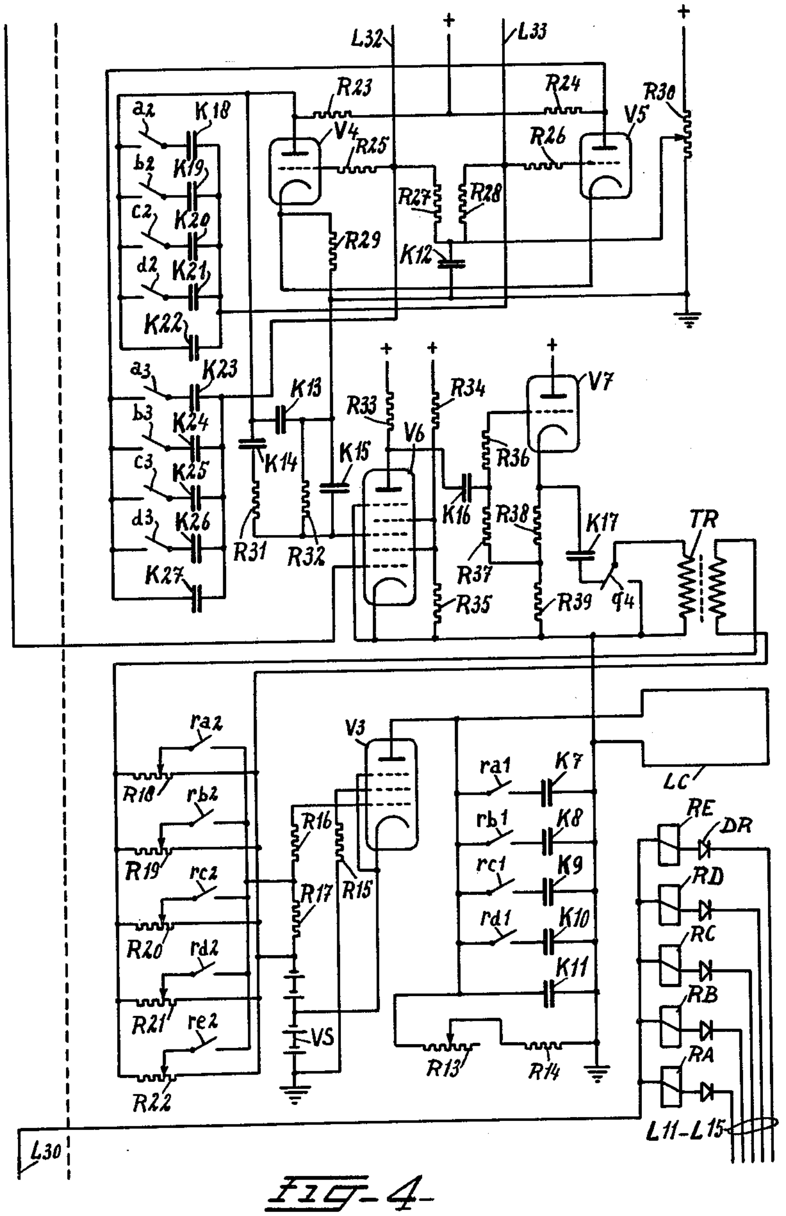
FIG. 4 shows the circuit diagrams of the carrier frequency oscillator, the modulator, the driver stage, the power stage, the loop circuit fed by said power stage, and a plurality of relays controlling the operation of said power stage.

Referring to FIG. 4 the power stage of the transmitter comprises a pentode V3, of which the anode is grounded through the loop circuit LC, surrounding the area in which the system is operative, whereas the cathode is connected to a suitable negative potential on a voltage source VS. The screen grid of pentode V3 is grounded through a resistor R15, the suppressor grid is connected with the cathode, and the control grid is connected through resistors R16 and R17 with a point of voltage source VS more negative than the cathode.

The input voltage of pentode V3 appears across resistor R17 and is taken from the secondary winding of input transformer TR. As the required amplification is dependent on the carrier frequency, a set of five volume control potentiometers R18, R19, R20, R21 and R22 are provided, one for each value of the carrier frequency. The appropriate potentiometer is selected by means of a contact *ra*2, *rb*2, *rc*2, *rd*2, or *re*, respectively one of the relays RA, RB, RC, RD and RE. These relays are each connected, through a decoupling rectifier DR, to one of lines L11–L15, and may be energized through line L30.

The said relays also serve to tune the loop circuit LC to the selected carrier frequency. For this purpose, any one of condensers K7, K8, K9, K10 may be connected in parallel with the loop circuit through contact *ra*1, *rb*1, *rc*1, or *rd*1, respectively. A condenser K11, tuning the loop circuit to the carrier frequency associated with relay RE (i.e. carrier frequency No. 5), is permanently connected in parallel with the loop circuit. A variable resistor R13, connected in series with a fixed resistor R14, provides a suitable damping of the loop circuit.

The carrier frequency oscillator comprises two triodes V4 and V5, connected in a multivibrator circuit. The anodes are connected with a point of positive potential through resistors R23 and R24, respectively. The control grids are connected through resistors R25 and R27, or R26 and R28, respectively, with the tap of a potentiometer R30 inserted between a point of positive potential and ground. The said tap is grounded through a condenser K12. The cathodes of triodes V4 and V5 are interconnected and grounded through a common resistor R29. Synchronizing potentials derived form a master oscillator to be described hereinafter may be supplied to the carrier frequency osccillator through either of lines L32 and L33, connected with the connection points between resistors R25 and R27, and between resistors R26 and R28, respectively.

In order to ensure the required multivibrator action, the anode of each of valves V4 and V5 is connected with the said connection point in the control grid circuit of the other valve through a suitable capacity. As this capacity determines the operating frequency of the multivibrator, the required carrier frequency may be selected by varying the same. For this purpose, the capacity between the anode of valve V4 and the control grid circuit of valve V5 consists of a condenser K22, to which any one of condensers K18, K19, K20 and K21 may be connected in parallel by a contact *a*2, *b*2, *c*2 or *d*2, respectively of one of the carrier selecting relays A, B, C, D and E. In the same manner, the capacity between the anode of valve V5 and the control grid circuit of valve V4 consists of a condenser K27, to which any one of condensers K23, K24, K25 and K26 may be connected in parallel by a contact *a*3, *b*3, *c*3, or *d*3, respectively of one of the carrier selecting relays.

The anode voltage of valve V4 of the carrier frequency oscillator is connected through a coupling network comprising resistors R31 and R32, and condensers K13, K14 and K15, with one of the control grids of a heptode modulator valve V6. The audio frequency modulating voltage is supplied to the other control grid of valve V6 through a line L31. The cathode and the suppressor grid of valve V6 are grounded. The screen grids are connected with the cathode through a resistor R35 and with a point of positive potential through a resistor R34. The anode of valve V6 is connected with a point of positive potential through a resistor R33, and with the control grid of a driver valve V7 through a coupling condenser K16 and a resistor R36. The cathode of valve V7 is grounded through the series connection of resistors R38 and R39. The connection point between condenser K16 and resistor R36 is connected with the connection point between resistors R38 and R39 through a resistor R37. Furthermore, the cathode of valve V7 is connected with the primary winding of transformer TR through a condenser K17 and a contact *q*4 (in its rest position).

Figure 5:
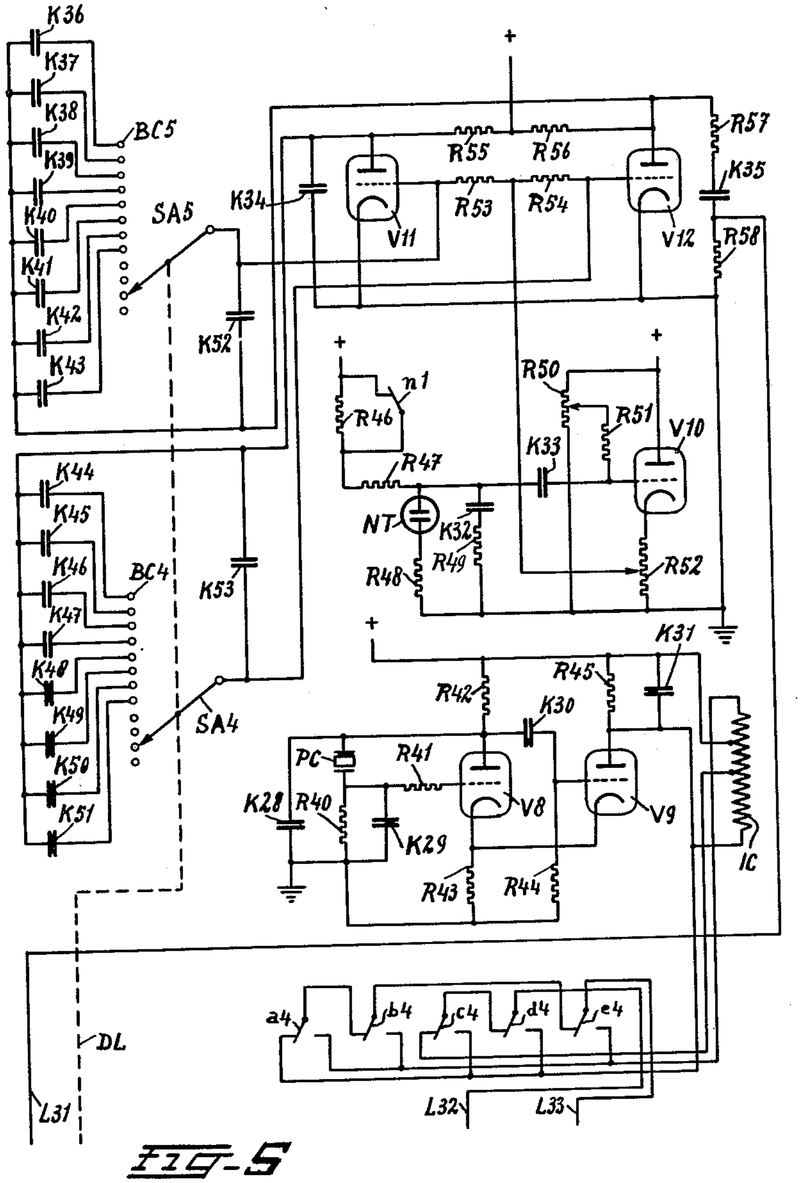
FIG. 5 shows the circuit diagrams of the master oscillator, the audio frequency oscillator, a low frequency saw-tooth oscillator controlling the audio frequency oscillator, and the remaining parts of said electromagnetic selector switch.

FIG. 5 shows a master oscillator, serving to control the carrier frequency oscillator, and comprising an oscillator valve V8. The anode and the control grid of valve V8 are interconnected through a piezo-electric crystal PC, in series with a resistor R41. The connection point between crystal PC and resistor R41 is grounded through a resistor R40, shunted by a condenser K29. A condenser K28 is connected between the anode and ground. The anode of valve V8 is connected with a point of positive potential through a resistor R42, and to the control grid of an amplifier valve V9 through a coupling condenser K30. The cathode of valves V8 and V9 are interconnected and grounded through a common resistor R34. The control grid of valve V9 is connected with ground through a resistor R44. The anode circuit of valve V9 comprises a resonant circuit consisting of a condenser K31 and a self inductance coil IC; a damping resistor R45 is connected in parallel with this circuit.

Master oscillator V8 generates a frequency which is considerably higher than the carrier frequencies to be used. The carrier frequency oscillator may be synchronized to various sub-harmonics of the frequency of the master oscillator. For this purpose, the oscillations generated by the master oscillator and amplified by means of valve V9 are supplied to the carrier frequency oscillator through lines L32 and L33. The phase of the required synchronizing voltage is dependent on the particular sub-harmonic frequency to be generated. Hence, the phase of the synchronizing voltage may be varied in the required manner by means of contacts *a*4, *b*4, *c*4, *d*4 and *e*2 of the carrier selecting relays.

FIG. 5 further shows a saw-tooth oscillator, operating at a very low frequency, and comprising a condenser K32, connected in series with a resistor R49, and adapted to be charged through series connected resistors R46 and R47. Resistor R46 is shunted by a break contact N1 of relay N, so that the operating frequency of the saw-tooth oscillator is decreased when relay N is energized. A neon tube NT, in series with a resistor R48, serves to discharge condenser K32 as soon as the voltage across the same has reached a predetermined level. Thus, a saw-tooth voltage appears across condenser K32. This voltage is supplied through a coupling condenser K33 to the control grid of an amplifier valve V10; this control grid is also connected through a resistor R51 with the tap of a potentiometer R50 connected between a point of positive potential and ground. The anode of valve V10 is connected with said point of positive potential, while the cathode is grounded through a potentiometer R52, of which the tap is connected with the control grid circuits of the audio frequency oscillator.

This oscillator comprises two triodes V11 and V12 connected in a multivibrator circuit. The control grids are interconnected through resistors R53 and R54, of which the connection point is connected with the tap of potentiometer R52. The anodes are interconnected through resistors R55 and R56, of which the connection point is connected with a point of positive potential. The cathodes of valves V11 and V12 are grounded. The anode of valve V11 is connected with ground through a condenser K34, while the anode of valve V12 is connected with ground through a circuit comprising a resistor R57, a condenser K35 and a resistor R58. The connection point between condenser K35 and resistor R58 is connected with one of the control grids of modulator valve V6 through line L31.

In order to ensure the required multivibrator action of valves V11 and V12, the anode of each valve is connected with the control grid of the other valve through a suitable capacity. This capacity determines the operating frequency of the audio frequency oscillator, so that the required modulating frequency may be obtained by varying the said capacity. For this purpose, the anode of valve V11 is connected with the control grid of valve V12 through a condenser K53, to which any one of condensers K44, K45, K46, K47, K48, K49, K50 and K51 may be connected in parallel. In the same manner, the anode of valve V12 is connected with the control grid of valve V11 through a condenser K52, to which any one of condensers K36, K37, K38, K39, K40, K41, K42, and K43 may be connected in parallel. Condensers K44–K51 are each connected with one of the contacts of a bank BC4, cooperating with switch arm SA4 of the electromagnetic selector switch. Likewise, condensers K36–K43 are each connected with one of the contacts of a bank BC5 cooperating with switch arm SA5 of said selector switch.

The operation of the circuit according to FIGS. 2–5 is as follows.

It will be assumed that the operator wants to call the person having the number 27, i.e. the person whose receiver is tuned to carrier frequency No. 2 and to modulating frequency No. 7. For this purpose, keys 2 and 7 are successively depressed.

Upon depression of key 2, relay F is energized by a current flowing from the positive terminal of the voltage source through relay F, contacts *p1* and *g2*, line L4, and switches *t23* and *t13* to ground. Contacts *f1*, *f2*, *f3* and *f4* are changed over. Contact *f4* provides a holding circuit for relay F through switch arm SA3. Relay B is energized through contact *f3*, resistors R3 and R2, relay B, line L12, switch *t21*, resistor R1, ground. Contacts *b1*, *b2*, *b3* and *b4* are changed over. Relay *b1* provides a holding circuit for relay B, and an effective short circuit of resistor R1, whereby the voltage drop in resistors R2 and R3 is increased to such an extent that it is made impossible for any of relays A, C, D and E to be energized through the associated key. Contacts *b2* and *b3* insert the proper condensers in the circuit of the carrier frequency oscillator to obtain carrier frequency No. 2. Contact *b4* provides for the appropriate phase of the synchronizing voltage supplied to the carrier frequency oscillator by the master oscillator. As line L12 is grounded through contact *b1*, the right hand contacts of the second vertical row of berths in the receiver rack RR are grounded. Pilot lamp PL is ignited through contacts *f2* and *g4*. Although contact *f1* is closed, relay G cannot be energized, as line L3 is interrupted at switch *t23*.

When the operator releases key 2, relay G is energized and contacts *g1*, *g2*, *g3*, and *g4* are changed over. Contact *g1* provides a holding circuit for relay G. The circuit of pilot lamp PL is interrupted.

At the moment, at which relay G is energized, valve V2 is conducting, as its control grid has a higher potentional than its cathode. As a consequence, relay Q is energized, so that its contacts *q1*, *q2*, *q3* and *q4* occupy positions opposite to those shown in the drawings. On the other hand, valve V1 is not conducting, as its control grid is grounded through contact *g3*, and its cathode is at a positive potential with respect to ground.

Now, as soon as relay G opens its contact *g3*, a charging current for condenser K3 begins to flow through resistors R7 and R6, whereby the potential of the control grid of valve V1 is gradually increased. As will be explained hereinafter, contact *q2* will be changed over immediately after depression of a second key, whereby this action is interrupted. However, if the operator fails to depress a second key, the potential of the control grid of valve V1 continues to increase, until after a time interval determined by the time constant of circuit R7, K3, R6, valve V1 becomes conducting and relay P is energized, so that contacts *p1* and *p2* are changed over. Contact *p1* interrupts the circuit of relay F, whereby relays F, B and G are de-energized, so that the circuit is reset to its zero position.

Upon depression of key 7, relay H is energized through switch *t72*, line L4 and contact *g2*. A positive potential is supplied to the right hand contact of berth 27 through contact *h3*, line L2, buzzer BZ, and switch *t73*. As the left hand contact is grounded through contact *b1* and line L12, the buzzer is sounded if the person in question is absent, i.e. if his receiver interconnects the contacts of berth 27.

Through contact *h2*, magnet M of the electromagnetic selector switch is energized. Due to the self-interrupting action of contact *m*, the selector makes one step after the other, so that the switch arms pass over the associated contact banks. Now, contact No. 7 of bank BC1 is grounded through switch *t71* and line L27. As soon as switch arm SA1 reaches this contact, the control grid of valve V2 is grounded, whereby this valve ceases to conduct and relay Q is de-energized. Contacts *q1*, *q2*, *q3* and *q4* return to the positions as shown in the drawings. Contact *q2* interrupts the circuit of magnet M, so that the electromagnetic selector switch remains in position No. 7. Through switch arms SA4 and SA5, the proper condensers are inserted in the modulating frequency oscillator to obtain the required modulating frequency. Contact *q4* connects the power stage with the driver. Through contact *q3* and line L30, relay RB is energized, whereby the appropriate potentiometer and the appropriate tuning condenser are inserted in the power stage. Through contacts *q3* and *g4*, the pilot is again ignited, indicating that the operator may now release key 7. Upon release of this key, relay H is held through contact *h1* and switch arm SA2. Valve V2 remains non-conducting due to the charges of condensers K5 and K6.

The call signal is now transmitted through loop circuit LC, and due to the action of saw-tooth oscillator NT, K32, the wanted person perceives an intermittent calling signal.

In the meantime, the charge of condensers K5 and K6 is leaking away through resistor R8, and after a time interval determined by the time constant of the discharge circuit, and generally corresponding to say four or five periods of the saw-tooth oscillator, valve V2 becomes again conducting. The power stage is disconnected from the driver, so that the signal transmission is interrupted. Magnet M is again energized, so that the electromagnetic selector switch resumes its movement. In position No. 10 of this selector switch, the holding circuit of relay F is interrupted at switch arm SA3, whereby relays F, B and G are de-energized. In position No. 11, the holding circuit of relay H is interrupted at switch arm SA2, so that relay H is de-energized. Contact *h2* interrupts the circuit of magnet M so that the selector switch remains in position No. 11. The circuit is now again in its zero position.

By means of keys X, Y and Z, the operator may perform the following functions:

By depressing key X, the cathodes of valves V1 and V2 are grounded. This makes valve V2 conducting, whereby the call signal, if any, is interrupted.

By depressing key Y after selection of the second digit of the number of the wanted person, relay N is energized, and held through contact *n1*. This changes the operating frequency of the saw-tooth oscillator, indicating a particular urgency of the call.

By depressing key Z, the control grid of valve V2 is grounded, whereby the transmission of the call signal continues indefinitely.

Figure 6:
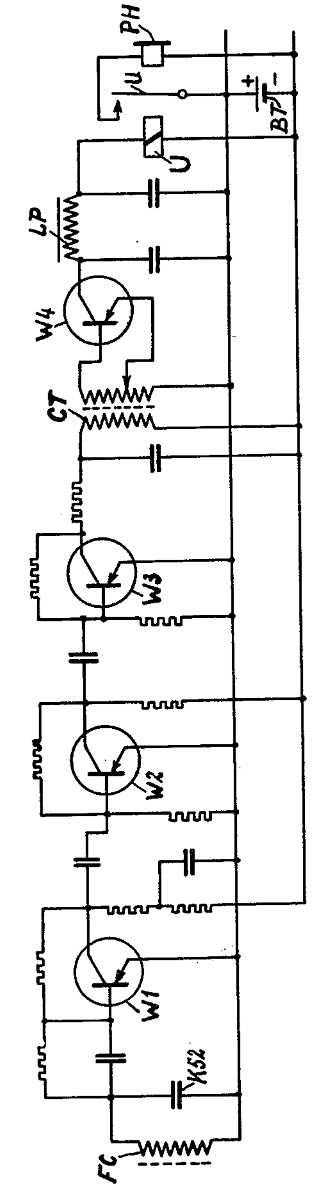

The receiver shown in FIG. 6 comprises an input circuit tuned to the required carrier frequency and consisting of a ferrite coil FC, which serves as an aerial at the same time, and a condenser K52. The modulated signal appearing across this input circuit is amplified in a three stage resistance coupled carrier frequency amplifier of conventional design, comprising transistors W1, W2, and W3. The output signal of transistor W3 is supplied, through a coupling transformer CT, to a demodulating transistor W4. The audio frequency output energy of transistor W4 is supplied, through a low pass filter LP serving to eliminate the carrier frequency component, to a resonant relay U. The armature *u* of this relay is formed as a resilient tongue or reed, having a mechanical resonance at the modulating frequency ascribed to the user of the receiver. Due to the variations of the modulating frequency caused by the action of the saw-tooth oscillator, the armature *u* is caused to vibrate intermittently. During each vibration period, an audible signal is produced by the telephone PH. The operating voltages of the receiver are furnished by a battery BT.

Suitable carrier frequencies for the above-described system are, for instance, 16, 18, 20.6, 24 and 28.8 kilocycles per second. All these frequencies may be synchronized by a master oscillator operating at a frequency of 144 kilocycles per second.

Suitable modulating frequencies are, for instance, 73.5, 81, 89, 96.5, 107, 120, 130, 142 and 156.5 cycles per second.

Although the invention has been described hereinbefore by reference to a specific embodiment, it is to be understood that this embodiment may be modified in many ways within the scope of the invention as defined in the appended claims.

What I claim is:

1. A personal call system for selectively calling a plurality of individuals in a given area, comprising a closed loop circuit in said area, a carrier frequency generator, a modulating frequency generator tunable to a plurality of modulating frequencies lower than the frequency of said carrier generator, means comprising a set of selector members connected to said modulating frequency generator each operable individually for tuning said modulating frequency generator to a corresponding one of said modulating frequencies, a modulator coupled with said carrier generator and said modulating frequency generator to modulate the carrier with the selected modulating frequency, a transmitter connected to supply the output energy of said modulator to said loop circuit, means operable by any one of said selector members for initiating the transmission of said modulated carrier to said loop circuit, a timing circuit having means actuated by operation of any one of said selector members to interrupt the transmission of said modulated carrier to said loop circuit after a suitable time interval, and a plurality of portable receivers each constructed to be carried by a respective one of the individuals to be paged, each receiver comprising means for receiving and detecting the signal supplied to said loop circuit, a resonance relay mechanically tuned to one of said modulating frequencies which is characteristic for the individual carrying the receiver, means to apply the detected signal to said resonance relay, and means controlled by said resonance relay to produce an audible signal when said relay is actuated, an electromagnetic selector switch having a driving magnet, a plurality of switch arms and a plurality of separate banks of contacts, each bank of contacts cooperating with a corresponding one of said switch arms, a plurality of frequency determining impedances in said modulating frequency generator connected with the contacts of at least one of said banks and connected so as to be put in circuit by the respective switch arm, means actuated by operation of any one of said selector members for starting said selector switch, and means for stopping said selector switch when a position determined by the actuated selector member is reached whereby the modulating frequency is adjusted to the desired value.

2. A personal call system as claimed in claim 1, in which said modulating frequency generator comprises two electron discharge tubes each having an anode and a control grid, a first plurality of capacitors connected between the anode of one of said electron discharge tubes and the control grid of the other one and connected to be placed in circuit by one of said switch arms of said selector switch, and a second plurality of capacitors connected between the anode of said other electron discharge tube and the control grid of said one tube and connected to be placed in circuit by a second switch arm of said selector switch.

3. A personal call system as claimed in claim 1, further comprising a power stage in said transmitter, a driver stage preceding said power stage, an electron discharge tube in said timing circuit having an anode and a control grid, a signal relay controlled by the anode circuit of said electron discharge tube, and means connecting said control grid with one of the switch arms of said selector switch whereby said signal relay is actuated when said selector switch reaches the position determined by the actuated selector member, said signal relay having means for connecting said power stage with said driving stage and for controlling the driving magnet of said selector switch whereby said selector switch is stopped when the position determined by the actuated selector member is reached and restarted after expiration of the time interval determined by said timing circuit.

4. A personal call system for selectively calling a plurality of individuals in a given area, comprising a closed loop circuit in said area, a carrier frequency generator tunable to a plurality of carrier frequencies, a modulating frequency generator tunable to a plurality of modulating frequencies lower than said carrier frequencies, a set of common selector members for successive selection of a carrier frequency and a corresponding modulating frequency, carrier selecting means controlled by the first selector member of said set to be operated, modulating frequency selecting means controlled by the second selector member of said set to be operated, switch-over means operative after actuation of a first selector member of said set for preparing the operation of said modulating frequency selecting means, means for modulating the selected carrier frequency by the selected modulating frequency and for supplying the modulated signal to said loop circuit, a timing circuit operably connected to said selector set placed in operation after the first actuation of a selector member of said set, means controlled by said timing circuit for resetting the system to its original condition after a suitable time interval unless a second selector member of said set is actuated, and a plurality of portable receivers each constructed to be carried by a respective one of the individuals to be paged, each receiver comprising an input circuit tuned to one of the said carrier frequencies which is characteristic for the individual carrying the receiver, means for detecting the signal picked up by said input circuit, a resonance relay mechanically tuned to one of said modulating frequencies which is characteristic for the individual carrying the receiver, means to supply the detected signal to said resonance relay, and means controlled by said resonance relay for producing an audible signal when said relay is actuated.

5. A personal call system as claimed in claim 4, further comprising a conductor on each of the said portable receivers, a receiver rack having a plurality of berths to accommodate a respective receiver when the receiver is not in use, a pair of contacts in each of the said berths interconnected by said conductor when the receiver is in its respective berth, an alarm circuit comprising said pair of contacts, and means operative after actuation of a second selector member of said set for exciting said alarm circuit whereby an alarm signal is given if the receiver of the individual called is in said receiver rack.

6. A personal call system as claimed in claim 4, further comprising a second timing circuit connected to be put in operation after the actuation of a second selector member of said set, and means controlled by said second timing circuit for interrupting the transmission of said modulated carrier after a suitable time interval.

7. A personal call system as claimed in claim 6, further comprising a first preparing relay energizable upon actuation of a first selector member of said set, a plurality of carrier selecting relays each operably connected with one of said selector members and connected to be energized through said first preparing relay, a plurality of frequency determining impedances in said carrier generator each connected to be placed in circuit by respective one of the said carrier selecting relays, a switch-over relay energizable upon release of said first selector member, a second preparing relay energizable upon actuation of a second selector member of said set through said switch-over relay, an electromagnetic selector switch having a driving magnet, a plurality of switch arms and a plurality of banks of contacts, each bank cooperating with a respective one of the said switch arms, a plurality of frequency determining impedances in said modulating frequency generator connected with the contacts of one of the said banks so as to be placed in circuit through the respective switch arm, means for starting said selector switch through said second preparing relay, means for stopping said selector switch when it reaches a position determined by the actuated selector member whereby the modulating frequency is adjusted to the desired value, means controlled by said second timing circuit for restarting said selector switch after expiration of the time interval determined by said second timing circuit, holding circuits for said first and second preparing relays, and means for interrupting said holding circuits in successive positions of said selector switch when the same is restarted whereby the system is restored to its rest condition.

References Cited in the file of this patent

UNITED STATES PATENTS

| | | |
|---|---|---|
| 2,138,894 | Ware | Dec. 6, 1938 |
| 2,547,024 | Noble | Apr. 3, 1951 |
| 2,559,622 | Hildyard | July 10, 1951 |
| 2,689,882 | Bergan | Sept. 21, 1954 |
| 2,701,279 | Lovell et al. | Feb. 1, 1955 |
| 2,870,435 | Graaf | Jan. 20, 1959 |
| 2,899,547 | Crow | Aug. 11, 1959 |